United States Patent
Hattig

(10) Patent No.: US 7,424,004 B2
(45) Date of Patent: Sep. 9, 2008

(54) SYSTEMS AND METHODS FOR NETWORKING PASSIVE INFORMATION DEVICES

(75) Inventor: Myron P. Hattig, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 10/880,156

(22) Filed: Jun. 28, 2004

(65) Prior Publication Data

US 2006/0034282 A1 Feb. 16, 2006

(51) Int. Cl.
*H04J 3/24* (2006.01)
*H04L 12/28* (2006.01)
*G06F 15/16* (2006.01)

(52) U.S. Cl. .................. 370/349; 370/393; 709/245; 709/249

(58) Field of Classification Search ........... 370/392, 370/389, 466, 471; 709/245, 249
See application file for complete search history.

(56) References Cited

U.S. PATENT DOCUMENTS

| | | | | |
|---|---|---|---|---|
| 6,473,413 B1* | 10/2002 | Chiou et al. | ........... | 370/331 |
| 6,754,854 B2* | 6/2004 | Kurrasch | ........... | 714/47 |
| 6,826,611 B1* | 11/2004 | Arndt | ........... | 709/226 |
| 2002/0126642 A1* | 9/2002 | Shitama | ........... | 370/338 |
| 2002/0165931 A1* | 11/2002 | Greer et al. | ........... | 709/217 |
| 2003/0018730 A1* | 1/2003 | Mori | ........... | 709/206 |
| 2003/0084219 A1* | 5/2003 | Yao et al. | ........... | 710/300 |
| 2003/0104848 A1* | 6/2003 | Brideglall | ........... | 455/574 |
| 2003/0167405 A1* | 9/2003 | Freund et al. | ........... | 713/201 |
| 2004/0017814 A1* | 1/2004 | Shimada | ........... | 370/395.52 |
| 2004/0095897 A1* | 5/2004 | Vafaei | ........... | 370/254 |
| 2004/0240445 A1* | 12/2004 | Shin et al. | ........... | 370/389 |
| 2005/0030955 A1* | 2/2005 | Galin et al. | ........... | 370/401 |
| 2005/0089041 A1* | 4/2005 | Idnani et al. | ........... | 370/395.5 |
| 2005/0253717 A1* | 11/2005 | Howarth et al. | ........... | 340/572.1 |
| 2006/0056313 A1* | 3/2006 | Rietschel | ........... | 370/254 |

* cited by examiner

*Primary Examiner*—Hassan Kizou
*Assistant Examiner*—Brandon Renner
(74) *Attorney, Agent, or Firm*—Schwegman, Lundberg & Woessner, P.A.; Gregory J. Gorrie

(57) ABSTRACT

Passive information devices are networked by formulating a network address for the information devices by combining a network address of an associated network node with at least a portion of a unique code of the passive information device.

27 Claims, 3 Drawing Sheets

PASSIVE INFORMATION DEVICE

SYSTEMS AND METHODS FOR NETWORKING PASSIVE INFORMATION DEVICES

TECHNICAL FIELD

Embodiments of the present invention pertain to networks and passive information devices.

BACKGROUND

Passive information devices, such as radio-frequency identification (RFID) tags, may be used to uniquely identify tagged items. One problem with the use of these devices is that they are often difficult to associate with a network, such as a sensor network.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
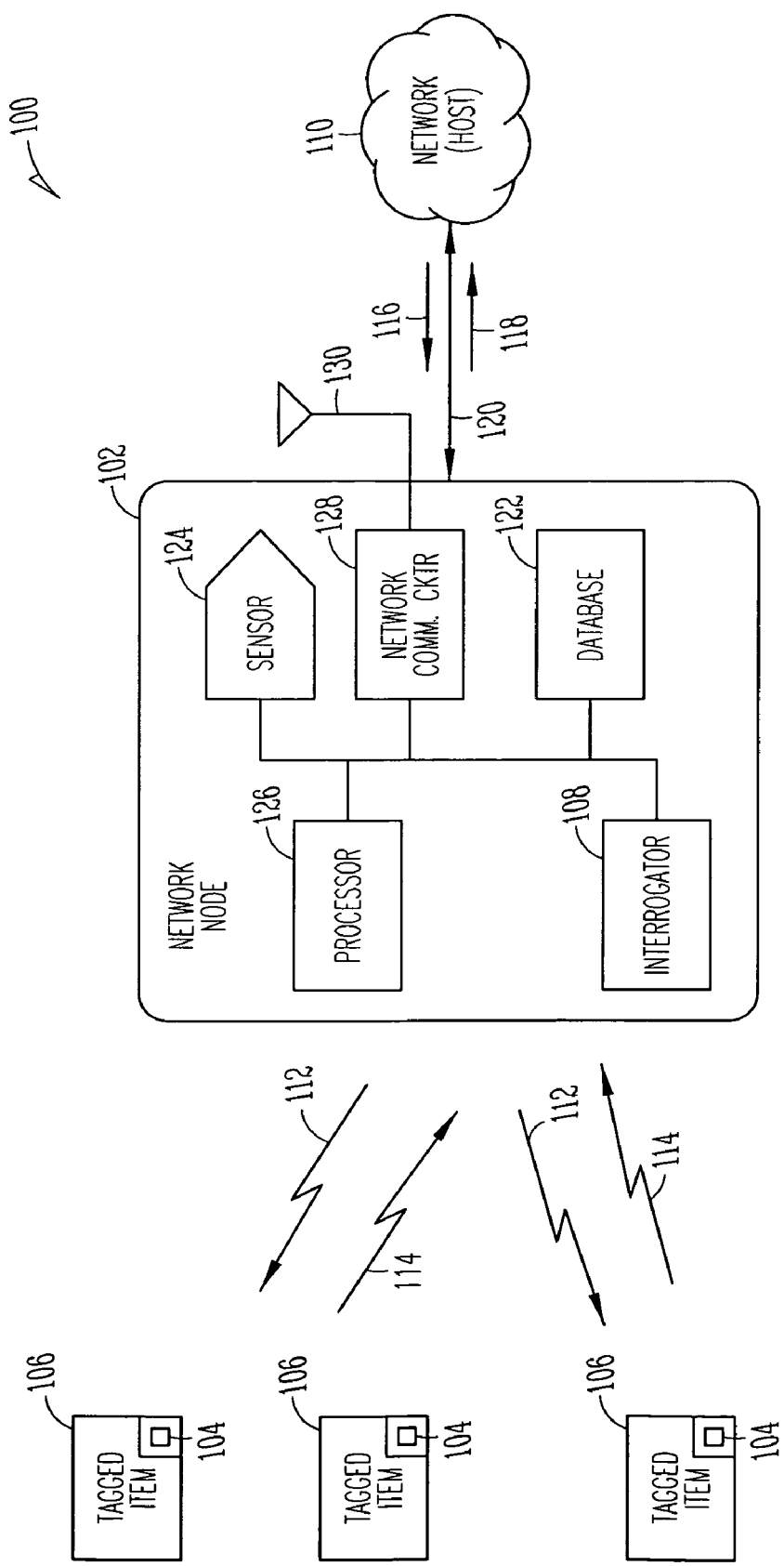
FIG. 1 illustrates a networking environment in accordance with some embodiments of the present invention.

FIG. 1 illustrates a networking environment in accordance with some embodiments of the present invention. Networking environment 100 may include network node 102 which is associated with network 110. Network node 102 may have a network address and may communicate with network 110 over communication link 120 using network communication circuitry 128. Networking environment 100 may also include one or more items 106 tagged with passive information devices 104. In some embodiments, tagged items 106 may have a network address and may be addressed by network 110 through network node 102. Passive information devices 104 may have unique codes associated therewith and may provide their codes in response to being interrogated. In some embodiments, passive information devices 104 may be radio-frequency identification (RFID) tags, although the scope of the invention is not limited in this respect.

In accordance with some embodiments, network node 102 comprises interrogator 108 to interrogate passive information devices 104 to receive the unique codes associated with the interrogated passive information devices 104. Network node may also include processor 126 to formulate a network address for each passive information device 104 by combining a network address of network node 102 with at least a portion of the unique code associated with the passive information device 104. In some embodiments, the interrogating may comprise transmitting interrogation signal 112 by interrogator 108 to one or more items 106 tagged with a passive information device 104, and receiving response signal 114 from the interrogated passive information devices 104. Response signal 114 may include the unique identifier associated with the passive information device 104. In some embodiments, interrogator 108 may be an RFID tag reader, although the scope of the invention is not limited in this respect.

In some embodiments, the network address of the tag may be unknown and may be requested by a requester. In these embodiments, network communication circuitry 128 may receive request 116 for a network address of one of passive information devices 104 associated with the network node 102. Network communication circuitry 128 may also be used to send reply 118 that includes the formulated network address of the passive information devices 104. In some embodiments, network communication circuitry 128 may encapsulate the reply in a network response packet sent over communication link 120. In some embodiments, interrogator 108 may interrogate passive information devices 104 in response to the request, and processor 126 may formulate the network address of a passive information device 104 in response to receipt of the request for the network address of the passive information device 104 and after receipt of the unique code. In some embodiments, request 116 and response 118 may be network packets, although the scope of the invention is not limited in this respect.

In some embodiments, interrogating comprises sending interrogation signal 112 to passive information devices 104 and receiving response signals 114 from passive information devices 104. Response signals 114 may include the unique code associated with each of the interrogated passive information devices 104.

In some embodiments, the information received in one or more of response signals 114 from interrogating passive information devices 104 may be screened before sending over network 110. In some embodiments, the screening may include screening by transmission control protocol (TCP) and/or user datagram protocol (UDP) port number based on a higher layer definition, such as an extensible markup language (XML) scheme, although the scope of the invention is not limited in this respect. Screening may be performed because more than one device in the vicinity may reply to a query. Screening may also be performed to help assure that the response sent back matches the request.

In some embodiments, request 116 may be a unicast packet that is directed to network node 102 (e.g., not to other nodes) to request or to determine the network addresses of passive information devices 104 associated with node 102. In other embodiments, request 116 may be a broadcast packet directed to more than one network node. In these embodiments, the sender may be requesting the network addresses of the passive information devices 104 associated with more than one node, or in some cases, all nodes of network 110.

In some embodiments, network node 102 may formulate network addresses for passive information devices 104 in response to requests 116 for the network addresses, while in other embodiments, network node 102 may formulate the network addresses for passive information devices 104 beforehand. When the network addresses are formulated beforehand, network node 102 may verify that a passive information device 104 is nearby when its network address is requested, although the scope of the invention is not limited in this respect.

In some embodiments, network node 102 may include database 122 to store the network addresses of passive information devices 104. In some embodiments, processor 126 reads the network address of a passive information device 104 from the database 122 in response to receipt of a request for the network address.

In some embodiments, network communication circuitry 128 may receive request 116 for network addresses of a plurality of passive information devices 104 associated with network node 102. Request 116 may be in the form of a broadcast or multicast packet, although the scope of the invention is not limited in this respect. Interrogator 108 may interrogate, in response to the request, passive information devices 104 to determine the unique code associated with each of the interrogated passive information devices 104. In some embodiments, processor 126 may formulate a network address for each of the interrogated passive information devices 104 by combining the network address of the network node 102 with at least a portion of the unique code associated with the associated passive information device 104. Network communication circuitry 128 may send one or more replies 118 that include one or more of the formulated network addresses.

In some embodiments, network node 102 may already have formulated the addresses for the passive information devices 104. In these embodiments, network node 102 may verify that the passive information device 104 is still within its interrogation range by transmitting interrogation signals.

In some embodiments, network communication circuitry 128 may receive a request to verify an association between one of items 106 tagged with a passive information device 104 and network node 102. In these embodiments, a request packet may be addressed to the network address of one of passive information devices 104. In these embodiments, processor 126 determines when the network address of the passive information device 104 received in the request is a network address of a passive information device 104 associated with network node 102, and instructs network communication circuitry 128 to send a reply indicating whether or not the passive information device 104 is associated with network node 102.

In some embodiments, interrogator 108 sends interrogation signal 112 to determine the unique code associated with passive information devices 104, and the presence of the item tagged with the passive information device 104 may be verified based on receipt of response signal 114 that includes the unique code of the passive information device 104, a portion of which was included in the request packet.

In some embodiments, processor 126 may compare the formulated network address with the network address of the passive information device 104 received in the request. In some embodiments, processor 126 may store the formulated network address in database 122 and may compare the formulated network address stored in database 122 with the network address of the passive information device 104 received in the request.

In some embodiments, processor 126 and network communication circuitry 128 verify that a formulated network address for one of tagged items 106 is an unused address by pinging network 110 to determine whether the formulated address is in use.

In some embodiments, network 110 may be a transmission control protocol/internet protocol (TCP/IP) network, and request 116 may be a TCP/IP packet received over the network link 120, although the scope of the invention is not limited in this respect. In some embodiments, request 116 may be received over network link 120 from an associated network. In some embodiments, network 110 may be an Ethernet-type network, and link 120 may be a wireline link operating in accordance with an Ethernet-type communication protocol, although the scope of the invention is not limited in this respect.

In some embodiments, network 110 may be a wireless local area network (WLAN), and link 120 may be a wireless link operating in accordance with a wireless local area network communication protocol, although the scope of the invention is not limited in this respect. In some embodiments, network node 120 may be an access point coupled with network 110 and may communicate over link 120 in accordance with one of the Institute of Electrical and Electronic Engineers (IEEE) 802.11 standards, although the scope of the invention is not limited in this respect. In some embodiments, network node 102 may include antenna 130 when network node 102 communicates over a wireless link with network 110. In these embodiments, antenna 130 may comprise a directional or omnidirectional antenna, including, for example, a dipole antenna, a monopole antenna, a loop antenna, a microstrip antenna or other type of antenna suitable for reception and/or transmission of RF signals over link 120.

In some embodiments, network node 102 may be a sensor node and may comprise sensor 124. Sensor 124 may monitor climate, movement, sound, the presence of tagged items, persons nearby, etc. In these embodiments, network node 102 may communicate information from sensor 124 to network 110.

In some embodiments, the word "passive", as used as part of "passive information device", refers to the fact that the information device may generate a response signal when interrogated and not on its own or otherwise. In some embodiments, the passive information devices 104 may include active RFID tags and/or passive RFID tags, further described below.

In some embodiments, processor 126 and/or interrogator 108 may perform a collision avoidance algorithm at least when response signals are received from more than one passive information device 104 to separate the unique codes concurrently received in response signals 114 from more than one of the interrogated passive information devices 104.

Tagged items 106 may include almost anything including devices, products, materials, inventory, office equipment, computing devices, pallets of products (e.g., in a warehouse), wrist bands on persons/children in amusement parks, etc. In some embodiments, database 122 may associate the unique codes of passive information devices 104 with information identifying the associated tagged item 106. This information may include an item description and/or other particulars about the item 106, such as a model number or serial number, for example. In some embodiments, this information may be provided in response to requests over network 110.

In some embodiments, when network 110 is an internet protocol (IP) version four (IPv4) network, formulating network addresses for passive information devices 104 may comprise performing a bitwise-AND operation on the IP network address of node 102 and the network mask to get the network portion of an IPv4 address, and using the lowest N number of bits from the unique code of the passive information device 104 (e.g., RFID identifier) for the host portion of the IPv4 address. N may be the number of host bits in the IP address. In some embodiments, when network 110 is an internet protocol version six (IPv6) network, network addresses for passive information devices 104 may be similarly formulated with 128-bit IPv6 addresses. Once a potential network address is formulated, network node 102 may ping the network address to see if it is in use. If the formulated address is not in use, this network address may be associated with the appropriate passive information device 104. If the network address is in use, the host portion of the IP address may be monotonically incremented until an unused network address is found, although the scope of the invention is not limited in this respect.

In alternative embodiments, network addresses for passive information devices 104 may be determined by requesting a dynamic host communication protocol (DHCP) server of network 110 for two network addresses. In these embodiments, network node 102 may spoof a unique media access control protocol (MAC) address and map the allocated network addresses to the unique codes associated with passive information devices 104.

Although environment 100 is illustrated with only one network node 102, embodiments of the invention are equally suitable to environments that include many network nodes. Although network node 102 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein.

Figure 2:
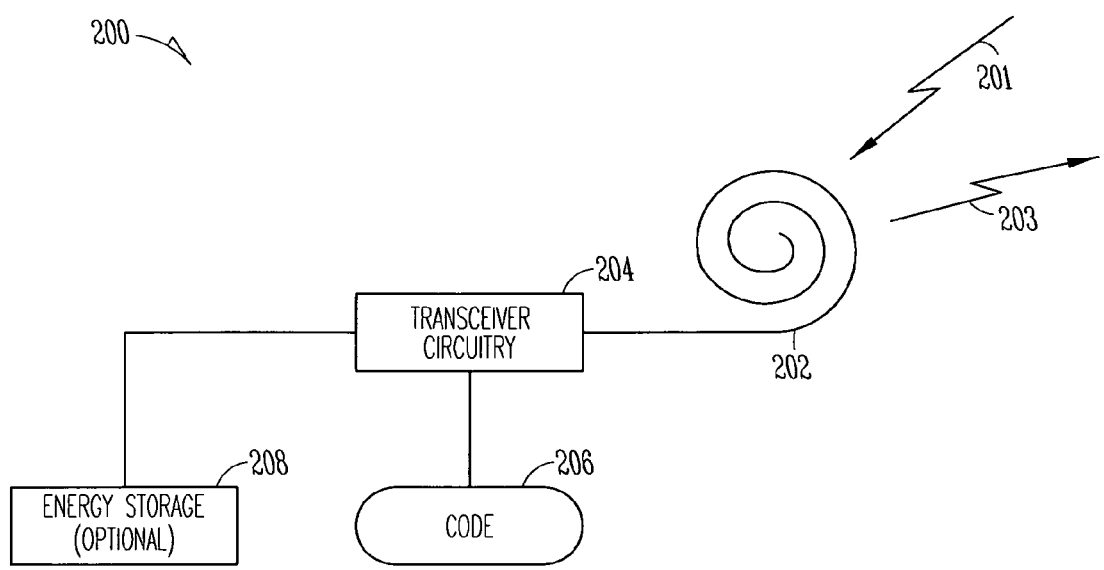
FIG. 2 is a block diagram of a passive information device suitable for use with some embodiments of the present invention.

FIG. 2 is a block diagram of a passive information device suitable for use with some embodiments of the present invention. In some embodiments, passive information device 200 may be a radio-frequency identification (RFID) tag, although the scope of the invention is not limited in this respect. Passive information device 200 may be suitable for use as one or more of tags or passive information devices 104 (FIG. 1), although other tags may also be suitable. Passive information device 200 may include antenna 202 to receive interrogation signals 201 and transmit response signals 203. Interrogation signals 201 may correspond to interrogation signals 112 (FIG. 1), and response signals 203 may correspond to response signals 114 (FIG. 1). Passive information device 200 may also include transceiver circuitry 204 for receiving interrogation signals 201 from antenna 202, and for transmitting response signals 203. Each passive information device 200 may have unique identification code 206 associated therewith. Antenna 202 may be a coil antenna, although other antennas may also be suitable.

Passive information device 200 may generate response signal 203 in response to interrogation signal 201 transmitted by network node 102 (FIG. 1). Response signal 203 may include unique identification code 206 associated with the particular tag.

In some embodiments, passive information device 200 may be a passive RFID tag. In these embodiments, the passive RFID tags may use current induced on antenna 202 by interrogation signal 201 to generate the response signal 203. In some embodiments, when passive information device 200 is a passive tag, no battery is generally included as part of the tag. In these embodiments, interrogation signal 201 may induce a current on antenna 202 to power transceiver circuitry 204, allowing transceiver circuitry 204 to transmit the tag's unique code 206 as part of response signal 203. In some embodiments, passive RFID tags may include a capacitive storage element (e.g., storage element 208) which may temporarily store some energy from interrogation signal 201.

In some embodiments, passive information device 200 may be an active RFID tag. In these embodiments, the active RFID tag may use an internal power source to generate response signal 203 in response to interrogation signal 201. In some embodiments, when passive information device 200 is an active tag, a battery or other energy storage element may be included as part of the tag (e.g., energy storage element 208). In these embodiments, energy storage element 208 may power transceiver circuitry 204 to allow transceiver circuitry 204 to transmit the tag's unique code 206 as part of response signal 206. In some embodiments, systems that use active tags may have a greater range than systems that use passive tags, because response signal 203 generated by an active tag may be more powerful than signals generated by a passive tag. In some embodiments, the ranges of systems using active RFID tags may be up to 100 feet and even greater. In some embodiments, passive information device 200 may include a built-in memory, although the scope of the invention is not limited in this respect.

Embodiments of the present invention may use either active or passive tags, or any combination of active and passive tags. In some embodiments, passive information device 200 comprises a low-frequency tag operating at frequencies ranging between 100 and 150 kHz. In some embodiments, a low-frequency tag may operate at approximately 125 kHz, although the scope of the invention is not limited in this respect.

In some embodiments, passive information device 200 comprises a high-frequency tag operating at frequencies ranging between approximately 10 and 15 MHz. In some embodiments, a high-frequency tag may operate at 13.56 MHz and may have a proximity threshold of about 10 feet, although the scope of the invention is not limited in this respect.

In some embodiments, passive information device 200 comprises an ultra-high-frequency tag operating at frequencies ranging between approximately 800 and 1000 MHz. In some embodiments, the ultra-high-frequency tag may operate at frequencies ranging from approximately 866 to 930 MHz, although the scope of the invention is not limited in this respect.

In some embodiments, passive information device 200 may comprise a microwave frequency tag operating at microwave frequencies ranging between approximately 5 and 6 GHz. In some embodiments, the microwave frequency tag may operate at frequencies of approximately 5.8 GHz and may having a proximity threshold of up to 30 feet, although the scope of the invention is not limited in this respect.

Figure 3:
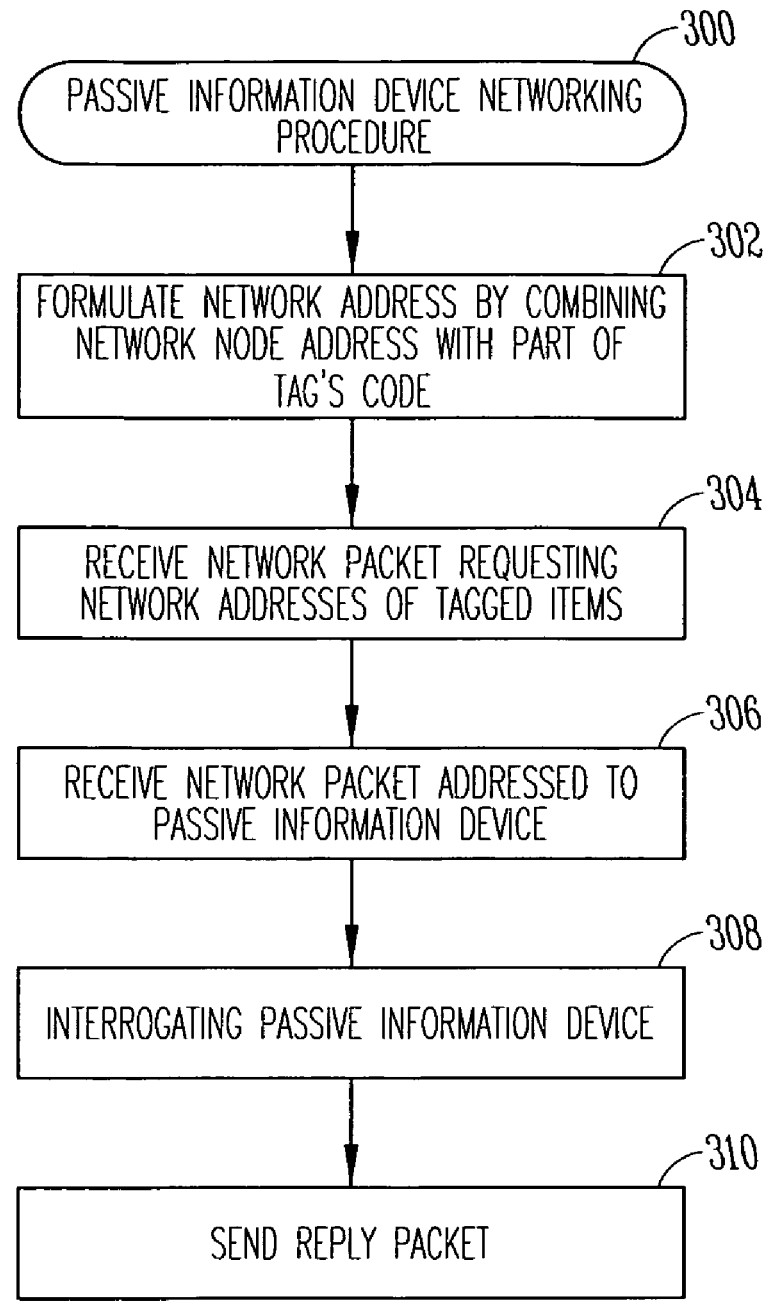
FIG. 3 is a flow chart of a passive information device networking procedure in accordance with some embodiments of the present invention.

FIG. 3 is a flow chart of a passive information device networking procedure in accordance with some embodiments of the present invention. Passive information device networking procedure 300 may be performed by a network node, such as network node 102 (FIG. 1), although other devices may also perform procedure 300. Passive information device networking procedure 300 may network one or more items tagged with passive information devices, such as tagged items 106 (FIG. 1). Although the individual operations of procedure 300 are illustrated and described as separate operations, one or more of the individual operations may be performed concurrently, and nothing requires that the operations be performed in the order illustrated.

Operation 302 comprises formulating a network address of one or more passive information devices. In some embodiments, operation 302 may comprise formulating a network address by combining a network address of the network node with at least a portion of a unique code associated with the passive information device. In other embodiments, a network address may be requested from a DHCP server. In some embodiments, operation 302 may include interrogating a passive information device to determine the unique code associated with the interrogated passive information device. In these embodiments, at least a portion of the unique code may be used to formulate the address.

Operation 304 comprises receiving a network packet requesting network addresses of one or more tagged items. In some embodiments, the network addresses of tagged items are unknown and are being requested by a requester. In some embodiments, operation 304 comprises receiving a request for a network address of a passive information device associated with the network node.

Operation 306 comprises receiving a network packet addressed to one or more of the passive information devices. In some embodiments, either or both operation 304 or operation 306 may be performed. In some embodiments when operation 306 is performed, the network address of a passive information device may be known by the network. In these embodiments, operation 306 may comprise receiving at the network node a request to verify an association between an item tagged with a passive information device and the network node. In some embodiments, the request may be addressed to the network address of the passive information device.

Operation 308 comprises interrogating the passive information device in response to the request received in either operation 304 or 306 to determine the unique code associated with the interrogated passive information device. In some embodiments, the network address may be formulated in response to receipt of the request for the network address in operation 304, although the scope of the invention is not limited in this respect. In some embodiments, operation 308 may be performed to determine the network address of the passive information device received in the request of a passive information device associated with the network node.

Operation 310 comprises sending a reply to the network. When operation 304 is performed, operation 310 comprises sending a reply that includes the formulated network address of one or more of the passive information devices. In some embodiments, the reply may be encapsulated in a network response packet and sent over a communication link, such as link 120 (FIG. 1). In some embodiments, (e.g., when operation 306 is performed) operation 310 may comprise sending a reply indicating whether or not a passive information device is associated with the network node.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method of networking passive information devices comprising;
   interrogating a passive information device with an interrogation signal to determine a unique code associated with the interrogated passive information device;
   formulating a network address for the passive information device by combining a host portion of a network address of a network node with at least a portion of the unique code associated with the passive information device such that the formulated network address includes the portion of the unique code and the host portion; and
   responding to receipt of a network packet addressed to the passive information device received at the network node, the network packet being addressed to the formulated network address,
   wherein when the network packet addressed to the passive information device received at the network node includes a request to verify an association between an item tagged with the passive information device and the network node, the method includes the network node:
   sending an interrogation signal;
   waiting for a response signal to the interrogation signal; and
   replying to the request to indicate whether or not the tagged item is associated with the network node depending on the unique code received in the response signal.

2. The method of claim 1 wherein the network packet comprises a TCP/IP packet addressed to the formulated network address of the passive information device, and
   wherein when the formulated network address is in use, the host portion of the IP address is monotonically incremented until an unused network address is found.

3. The method of claim 2 further comprising:
receiving a request for a network address of a passive information device associated with the network node; and
sending a reply that includes the formulated network address,
wherein the passive information device includes a capacitive energy storage element to temporarily store energy from the interrogation signal for use in generating a response signal that includes the unique code.

4. The method of claim 3 further comprising interrogating the passive information device in response to the request to determine the unique code associated with the interrogated passive information device, and
wherein formulating the network address is performed in response to receipt of the request for the network address of the passive information device and after receipt of the unique code.

5. The method of claim 4 wherein interrogating comprises sending an interrogation signal to the passive information device and receiving a response signal from the passive information device, the response signal including the unique code associated with the passive information device.

6. The method of claim 3 further comprising:
storing the network address of the passive information device in a database of the network node after the formulating; and
reading the network address of the passive information device from the database in response to receipt of the request for the network address.

7. The method of claim 3 wherein receiving the request comprises receiving a request packet over a network link from an associated network, the network being a transmission control protocol/internet protocol (TCP/IP) network, and the request packet being a TCP/IP packet.

8. The method of claim 3 wherein receiving the request comprises receiving a request packet over a network link from an associated network, the network being an Ethernet-type network, and
wherein the network link is a wireline link operating in accordance with an Ethernet-type communication protocol.

9. The method of claim 3 wherein receiving the request comprises receiving a request packet over a network link from an associated network, the network being a wireless local area network, and
wherein the network link is a wireless link operating in accordance with a wireless local area network communication protocol.

10. The method of claim 1 further comprising:
receiving a request for network addresses of a plurality of passive information devices associated with the network node;
interrogating the plurality of passive information devices to determine a unique code associated with each of the interrogated passive information devices;
formulating a network address for each of the interrogated passive information devices by combining the network address of the network node with at least a portion of a unique code associated with each associated passive information device; and
sending one or more replies that include the formulated network addresses.

11. The method of claim 1 further comprising:
receiving a request to verify an association between an item tagged with a passive information device and the network node, the request being addressed to the network address of the passive information device;
determining when the network address of the passive information device received in the request is a network address of a passive information device associated with the network node; and
sending a reply indicating whether or not the passive information device is associated with the network node.

12. The method of claim 11 wherein determining comprises:
sending an interrogation signal to determine a unique code associated with nearby passive information devices; and
verifying the presence of the item tagged with the passive information device by receipt of a response signal that includes a unique code of the passive information device, a portion of which was included in the request.

13. The method of claim 11 wherein determining comprises comparing the formulated network address with the network address of the passive information device received in the request.

14. The method of claim 11 further comprising storing the formulated network address in a database, and
wherein determining comprises comparing the formulated network address stored in the database with the network address of the passive information device received in the request.

15. The method of claim 2 further comprising verifying that the formulated network address is an unused address by pinging a network to determine whether the formulated address is in use.

16. The method of claim 15 wherein the passive information device comprises a radio-frequency identification (RFID) tag and the network node is a sensor node.

17. The method of claim 1 wherein interrogating further comprises performing a collision avoidance algorithm at least when response signals are received from more than one passive information device to separate the unique codes received in response signals from more than one of the interrogated passive information devices.

18. A network node comprising:
an interrogator to interrogate a passive information device to receive a unique code associated with the interrogated passive information device;
a processor to formulate a network address for the passive information device by combining a host portion of a network address of the network node with at least a portion of the unique code associated with the passive information device such that the formulated network address includes the unique code and the host portion; and
network communication circuitry to receive a network packet addressed to the formulated network address,
wherein when the network packet is addressed to the passive information device by being addressed to the formulated network address and includes a request to verify an association between an item tagged with the passive information device and the network node, the interrogator is configured to send the an RF interrogation signal and wait for a response signal to the RF interrogation signal, and
wherein the network communication circuitry is configured to reply to the request to indicate whether or not the tagged item is associated with the network node depending on a unique code received in the response signal.

19. The network node of claim 18 wherein the network packet comprises a TCP/IP packet addressed to the formulated network address of the passive information device, and wherein the network communication circuitry is further configured to receive a request for a network address of a passive information device associated with the network node and to send a reply that includes the formulated network address of the passive information device, wherein when the formulated network address is in use, the host portion of the IP address is monotonically incremented until an unused network address is found.

20. The network node of claim 19 wherein the interrogator is to interrogate the passive information device in response to the request to determine the unique code associated with the passive information device,
wherein the processor is to formulate the network address in response to receipt of the request for the network address of the passive information device and after receipt of the unique code, and
wherein the passive information device includes a capacitive energy storage element to temporarily store energy from the interrogation signal for use in generating a response signal that includes the unique code.

21. The network node of claim 19 further comprising a database to store the network address of the passive information device, wherein the processor is to read the network address of the passive information device from the database in response to receipt of the request for the network address.

22. The network node of claim 18 further comprising network communication circuitry to receive a request to verify an association between an item tagged with a passive information device and the network node, the request packet being addressed to the network address of the passive information device,
wherein the processor is to determine when the network address of the passive information device received in the request is a network address of a passive information device associated with the network node and is to instruct the network communication circuitry to send a reply indicating whether or not the passive information device is associated with the network node.

23. The network node of claim 22 wherein the interrogator is to send an interrogation signal to determine a unique code associated with nearby passive information devices, and
wherein the processor is to verify the presence of the item tagged with a passive information device based on receipt of a response signal that includes a unique code of the passive information device, a portion of which was included in the request packet.

24. The network node of claim 19 further comprising network communication circuitry,
wherein the processor and the network communication circuitry are to verify that the formulated network address is an unused address by pinging an associated network to determine whether the formulated address is in use.

25. The network node of claim 19 wherein the request is to be received over a network link from an associated network, the network being a wireless local area network, and
wherein the network link is a wireless link operating in accordance with a wireless local area network communication protocol.

26. The network node of claim 24 wherein the passive information device comprises a radio-frequency identification (RFID) tag and the network node is a sensor node.

27. The network node of claim 18 wherein the processor is to perform a collision avoidance algorithm at least when response signals are received from more than one passive information device to separate the unique codes received in response signals from more than one of the interrogated passive information devices.

* * * * *

UNITED STATES PATENT AND TRADEMARK OFFICE
CERTIFICATE OF CORRECTION

PATENT NO. : 7,424,004 B2
APPLICATION NO. : 10/880156
DATED : September 9, 2008
INVENTOR(S) : Hattig Page 1 of 1

It is certified that error appears in the above-identified patent and that said Letters Patent is hereby corrected as shown below:

In column 8, line 36, in Claim 1, after "comprising" delete ";" and insert -- : --, therefor.

In column 10, line 58, in Claim 18, after "to send" delete "the".

Signed and Sealed this

Second Day of December, 2008

JON W. DUDAS
*Director of the United States Patent and Trademark Office*